United States Patent [19]

Wilkins

[11] Patent Number: 5,284,105
[45] Date of Patent: Feb. 8, 1994

[54] SIGHT GLASS ASSEMBLY AND WIPER FOR CARGO HOLDS

[75] Inventor: Larry C. Wilkins, New Albany, Ind.

[73] Assignee: Electromechanical Research Laboratories, Inc., New Albany, Ind.

[21] Appl. No.: 661,551

[22] Filed: Feb. 26, 1991

[51] Int. Cl.⁵ .............................................. B63B 19/02
[52] U.S. Cl. ................... 114/173; 15/250.36; 73/324; 73/334
[58] Field of Search ............... 114/173, 177, 178; 73/324, 334, 330, 325; 15/250.22, 250.36

[56] References Cited

U.S. PATENT DOCUMENTS

| | | | |
|---|---|---|---|
| 2,466,437 | 4/1949 | Jurs | 73/324 |
| 2,680,874 | 6/1954 | Mitchell | 73/324 |
| 3,089,338 | 5/1963 | Glasgow | 15/250.22 |
| 3,402,418 | 9/1968 | Le Roy | 73/324 |
| 3,902,218 | 9/1975 | Bryant | 15/250.22 |
| 3,951,301 | 4/1976 | Meginnis | 73/334 |
| 3,957,359 | 5/1976 | Meginnis | 73/334 |
| 3,977,251 | 8/1976 | Meginnis | 73/334 |
| 4,037,471 | 7/1977 | Okamoto et al. | 73/324 |
| 4,827,770 | 5/1989 | Schwartz et al. | 15/250.22 |
| 5,123,140 | 6/1992 | Raymond | 15/250.36 |

FOREIGN PATENT DOCUMENTS

| | | | |
|---|---|---|---|
| 1425456 | 4/1966 | France | 114/173 |
| 496876 | 8/1954 | Italy | 15/250.36 |

Primary Examiner—Michael S. Huppert
Assistant Examiner—Thomas J. Brahan
Attorney, Agent, or Firm—Woodard, Emhardt, Naughton, Moriarty & McNett

[57] ABSTRACT

A sight glass assembly is bolted to a mounting flange welded to a barge deck around an opening therein at the top of a cargo tank in the barge. A couple of wiper assemblies are mounted to the sight glass and are operable from outside the glass by hand cranks. Each wiper assembly includes a replaceable wiper cartridge having an O-ring as the glass wiping member. The sight glass assembly can be unbolted from the mounting flange for ready access to the replaceable cartridges.

4 Claims, 6 Drawing Sheets

5,284,105

SIGHT GLASS ASSEMBLY AND WIPER FOR CARGO HOLDS

BACKGROUND OF THE INVENTION

1. Field of the Invention

This invention relates generally to observation windows for observing the contents of a cargo hold in a vessel or the like, and more particularly to a deck mounted sight glass for cargo holds of marine vessels.

2. Description of the Prior Art

For various reasons, during the filling, transport, and emptying of cargo holds, it is desirable to inspect the interior thereof. For cargo holds on barges, the typical practice is to provide a sight glass in the deck or in a hatch. It is quite common for such sight glasses to become partially or entirely occluded by the contents of the hold, particularly if the contents are powdered, dusty, or liquid in form. To aid in dealing with this problem, there have been some instances where a wiper is applied to the inside face of the sight glass and operable by a T-handle or the like from the outside, to clear the glass. But the contents of the hold are sometimes very detrimental to the material used in the wiper. A material somewhat resistant to one type of chemical, may be very susceptible to attack by another type of chemical, necessitating repair on a more frequent than desirable basis. Also, because of the way that sight glasses are normally mounted to decks sealing them and maintaining a seal can be very difficult. The present invention is directed to reducing the difficulty in dealing with these problems.

SUMMARY OF THE INVENTION

Described briefly, according to a typical embodiment of the present invention, an opening is provided in the vessel decking or expansion dome at the top of the cargo hold. A sight glass mounting flange is secured and sealed around the opening. Then the sight glass assembly according to the present invention is bolted to the mounting flange, using an effective seal member which is generally chemically inert. The sight glass has at least one wiper assembly mounted thereto and which is operable from outside the cargo hold. It includes a wiper cartridge assembly facilitating the replacement of a wiper member which may become worn or damaged as a result of attack by the cargo material.

DESCRIPTION OF THE PREFERRED EMBODIMENT

Figure 1:
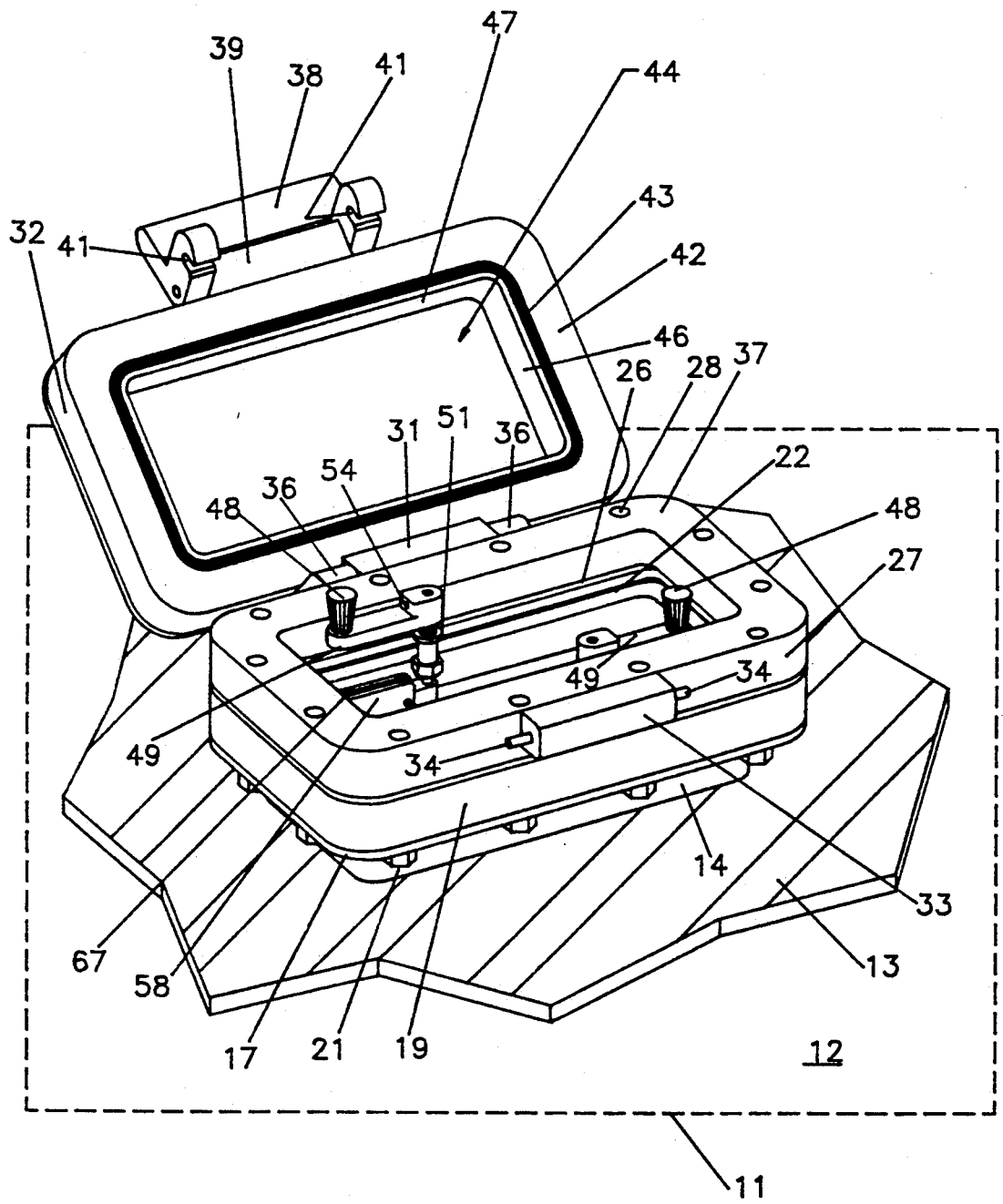
FIG. 1 is a pictorial view of a sight glass assembly as installed on the deck of a marine vessel, with the sight glass cover open.

For the purposes of promoting an understanding of the Principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
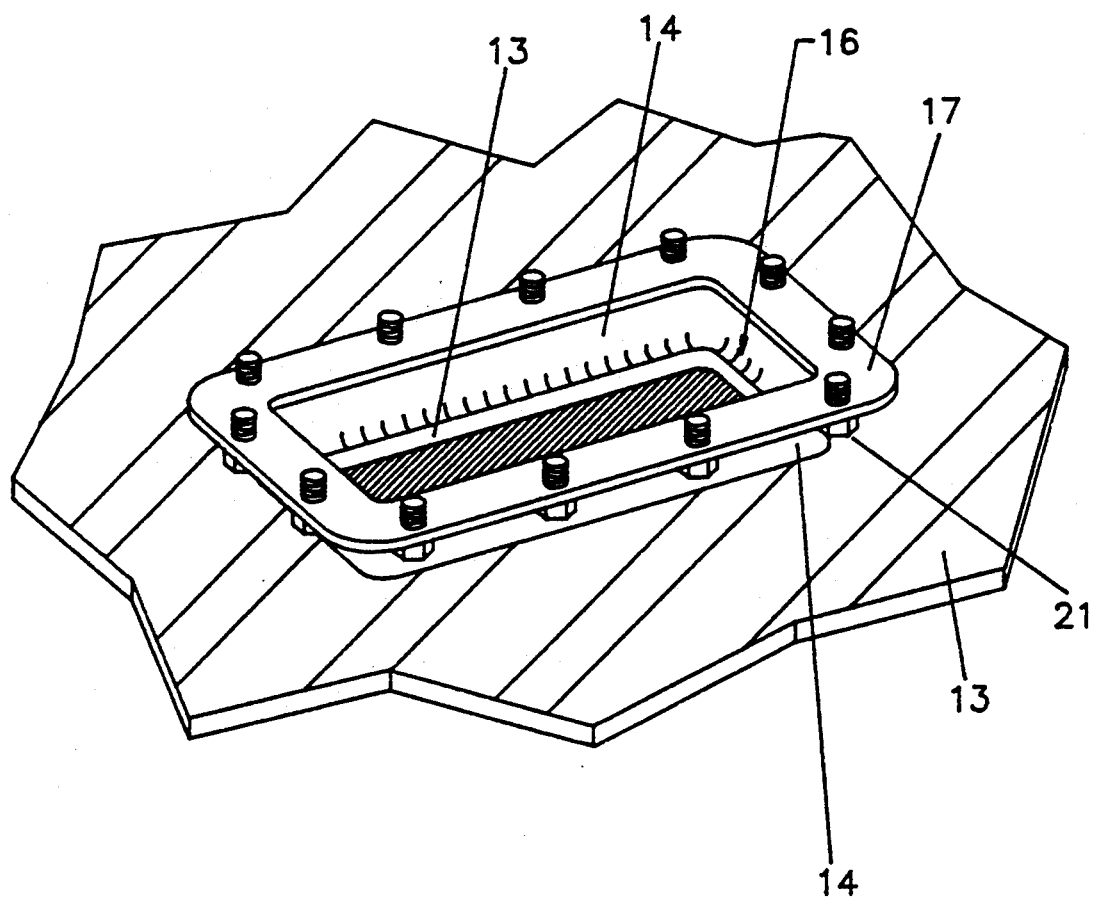
FIG. 2 is a pictorial view of the deck with the deck flange secured to it.

Referring to the pictorial view of FIG. 1, the dotted line 11 represents schematically the boundaries of the hold 12 of a cargo vessel whose upper boundary is the deck 13. The sight glass assembly according to a typical embodiment of the present invention, includes a base frame having an upstanding frame portion 14 welded to the top of the deck around an opening 16 (FIG. 2) through the deck and through which the contents of the hold can be observed. At the top of the frame portion 14 is a horizontally extending perimetrical flange 17. This flange is factory welded to the frame portion 14 under controlled conditions so that there can be no warpage in the flange 17, and the top of the flange is machined flat. This base frame 14, 17 is first lightly tack welded to the deck at four corners of portion 14, and then lightly tacked in at least four more places, to prevent warping. Then continuous welding to the deck is performed around the perimeter of portion 14, both inside and outside the wall formed by portion 14. The base frame is rigid, and resists warping as the frame 14 is welded to the deck 13, so that the top of flange 17 remains flat. Of course, care should be taken during welding, to minimize warping forces. The deck flange has a plurality of holes in its upwardly facing flat top surface and through which hexagonal head bolts can be installed in the twelve locations shown. The remainder of the sight glass assembly is thereby readily mounted to and removed from the deck flange 17, when necessary.

Figure 3:
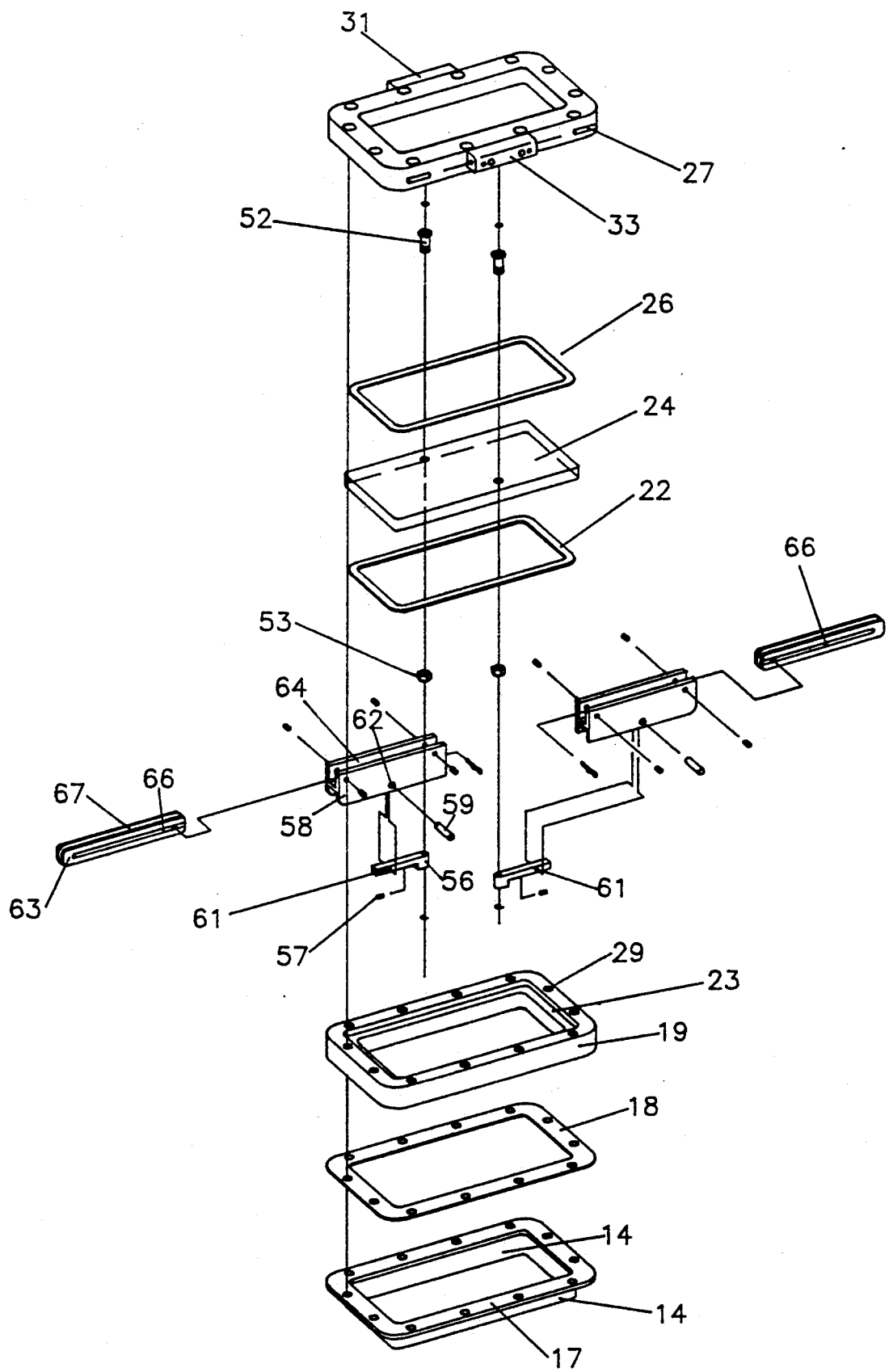
FIG. 3 is an exploded view of the assembly without the cover and separate from the deck.

Referring now to FIGS. 1 and 3, a seal ring in the form of flange gasket 18 is mountable to the flange 17 and receives on it, the sight glass mounting frame or bottom flange 19 of the glass holder assembly. This frame is secured to the deck flange 17 by the twelve bolts 21. A bottom glass seal 22 is received in the frame 19 and rests on an inwardly extending perimetrical shelf 23. A glass 24 rests on the seal 22. A top glass seal 26 rests on top of the glass 24. A glass retainer frame or top flange 2 rests on top of the seal 26, the top flange also having a downwardly facing recess in the bottom of it facing the shelf 23 in bottom flange 19 but not shown in the drawings herein since it is on the bottom of frame 27. The assembly of the top flange 27 to the bottom flange 19 with the glass 24 in the perimetrical groove between the seals 22 and 26 in the shelf and the recess, respectively, is accomplished by twelve socket head cap screws 28 received in the holes 29 in the top of the bottom flange 19 whereby the glass is securely sealed between the two flanges 19 and 27.

While the holes 29 in the bottom flange 19 are colinear and threaded entirely through that member, the length of the cap screws securing the top flange 27 to the bottom flange 19 and the length of the hexagonal head bolts 21 securing the bottom flange 19 to the deck flange 17 is such that the cap screw ends do not reach and interfere with the bolt ends, but rather accommodate secure assembly of all of the components in a liquid-tight manner to the deck 13.

The top flange 27 has a cover mounting boss 31 on the far side of it which receives a cover bolt (not shown) horizontally therethrough to hingedly mount the cover 32 to the top flange. A latch pin mounting boss 33 on the near side of the top flange 27 has latch pins 34 secured in it and extending horizontally from each end of it. The cover has two hinge posts 36 which are hingedly mounted to the top flange boss 31 by the above-mentioned hinge bolt, so that the cover can be moved from the open position shown in FIG. 1 to a closed position on top of the top face 37 of the top flange 27 whereupon the cover can be secured in place by the latch 38 which is hinged to a boss 39 on the cover and has a couple of notches 41 therein receivable on the latch pins 34 whereby the cover is secured in the closed condition. The underside of the cover shown exposed at 42 in FIG. 1 with the cover open, has a groove in it which receives an O-ring gasket 43 which securely seals the cover to the top surface 37 of the top flange 27 when the cover is closed and latched.

It can also be observed in FIG. 1 that the cover has a central recess whose vertical walls such as 46 and 47 are set slightly inboard of the groove in the surface 42 which receives the O-ring 43. This central recess accommodates the knobs 48 projecting upward from the distal ends of handles 49 of the two wiper assemblies that are mounted to the glass 24.

Each of the wiper assemblies includes a shaft 51 which extends down from the handle 49 through a headed bushing 52 (FIG. 3) secured in the place by a nut 53 at the lower end of the bushing. The handle is secured to the shaft 51 by a set screw at 54. A wiper arm 56 is mounted to the lower end of the shaft by a set screw 57. A wiper cartridge holder 58 that is "H" shaped in cross section (FIG. 5) is pinned to the arm 56 by a "Rollpin" 59 received through the hole 61 in the arm 56 and through a hole 62 in each leg of the "H" of the cartridge holder 58. A wiper cartridge 63 is located in the upwardly facing groove 64 of the cartridge holder by four dog point set screws 65 (FIG. 4), one at each of the two holes in each of the arms of the "H" of the cartridge holder and received in the longitudinally extending side grooves 66 of the cartridge 63. The pin 59 is snug in the cartridge holder 58 and just loose enough in the arm 56 so that the cartridge holder can slightly pivot relative to the arm 56 about the axis of the pin 59 which is parallel to the bottom face of the glass. The set screws 65 are factors set and locked (as by adhesive) to serve as locators and guide pins or stems and supports for the cartridge as will be more fully described hereinafter.

Figure 4:
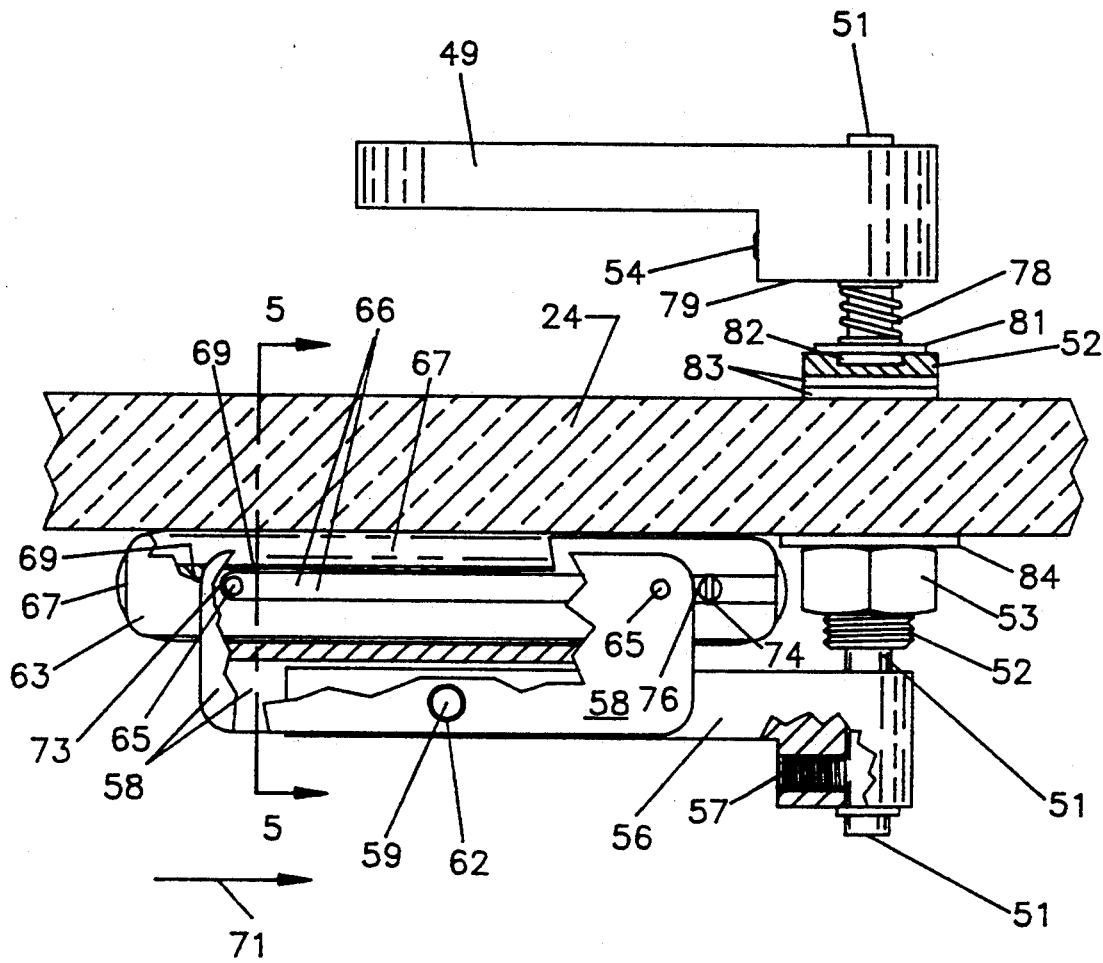
FIG. 4 is an enlarged view of the replacement wiper cartridge assembly.
Figure 5:
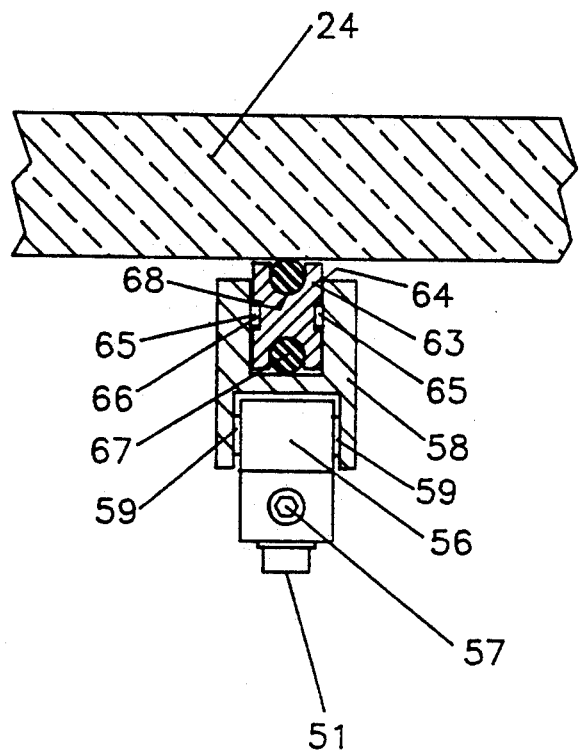
FIG. 5 is a section taken through the replacement cartridge assembly at line 5—5 in FIG. 4 and viewed in the direction of the arrows.
Figure 6:
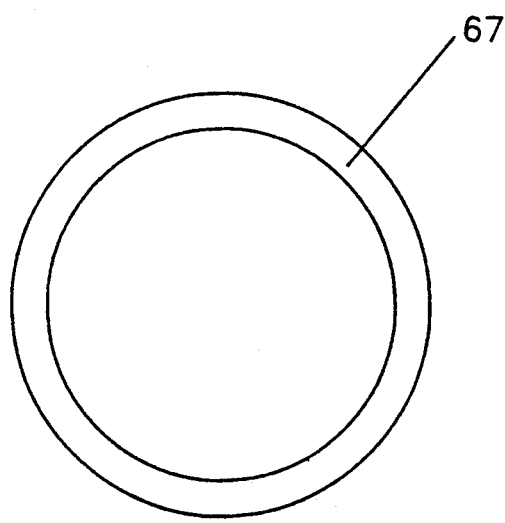
FIG. 6 is an elevational view of the wiper ring itself apart from the cartridge assembly.

An O-ring 67 is received in a perimetrical, round-bottomed groove 68 of cross section shown in FIG. 5 extending entirely around the outer edge of the cartridge 63, ring 67 thus entirely encircling the cartridge. Although the illustrated groove is of round bottom in cross section, it could be rectangular, particularly if a wiper ring of some shape other than O-ring were used. In either case the bottom of the groove is straight longitudinally of the cartridge as shown at 69 in FIG. 4. This provides support for the upper "run" of the O-ring throughout that portion of it whose top engages the bottom of the glass. The pivoting of cartridge holder 58 on arm 56 enables the line of the bottom of the cartridge groove as at 69 to remain parallel to the plane of the glass bottom surface at all times during operation of the wiper. Therefore, when all of this is assembled together, the upper portion of the O-ring 67 engages the lower face of the glass 24 so that, as the wiper knob is manipulated through an arc of 180° about the axis of the shaft 51, the top portion of the O-ring wipes the bottom side of the glass through a 180° arc. Since the cartridge 63 is symmetrical about its horizontal and vertical centerlines, and guide grooves 66 are located on the cartridge at its horizontal centerline, replacement cartridges can be installed without concern about whether or not it is upside down. Also, if only the O-ring is replaced, it is not necessary to remember the cartridge orientation as it was removed from the holder.

Figure 7:
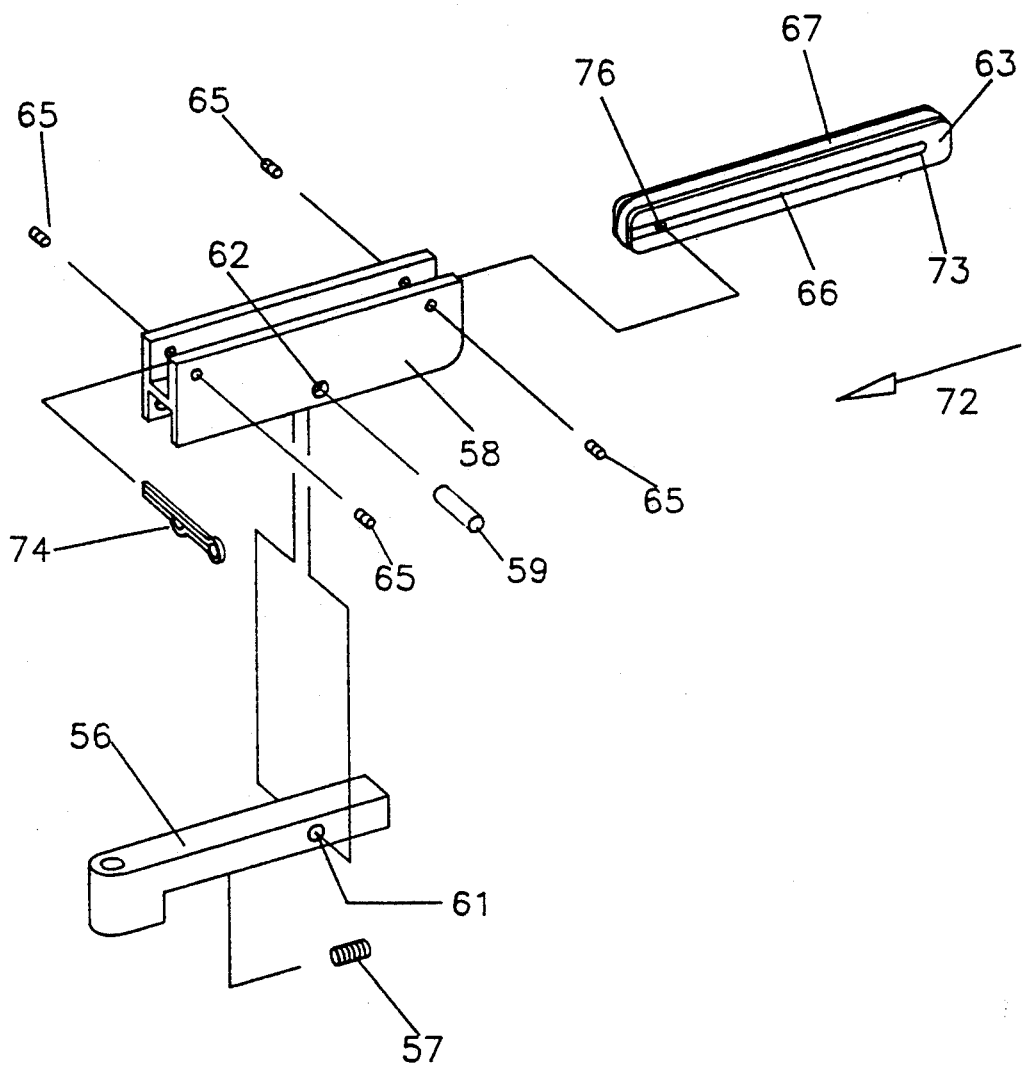
FIG. 7 is an enlarged exploded view of one of the cartridge assemblies.

FIG. 1 shows two operation handles, one for each of the two wiper assemblies. FIG. 3 shows the two cartridge assemblies. FIG. 4 shows the one at the left in FIG. 3, and FIG. 7 shows the one at the right in FIG. 3. The assemblies are identical. The cartridge 63 in FIG. 4 is installed in the holder 58 by sliding it to the right in the direction of the arrow 71. The cartridge 63 in FIG. 7 is installed in that holder by sliding it to the left in the direction of the arrow 72. In each case, the guide screws 65 permit the free sliding action until the end 73 of each of the side grooves 66 abuttingly engages the outboard guide screw in the holder and stops the sliding of the cartridge toward the shaft 51. The cartridge is prevented from sliding back out of the holder groove 64 by inserting a cotter pin 74 through the hole 76 in the cartridge. This pin will abuttingly engage and stop against the inboard end of the cartridge holder if the cartridge moves slightly outward away from the shaft 51, and will thus prevent the cartridge from sliding out of the groove 64. It will be evident that this arrangement makes it easy to replace a cartridge by pulling out the cotter pin, and sliding the cartridge out of the groove. If desired, and if the bottom "run" of the O-ring is still in good condition, the cartridge can be turned over and pushed back into the groove, the cotter pin re-installed, and the sight glass assembly placed in operation again. The bottom "run" of the O-ring is likely to be in good condition since the cartridge holds it spaced above the horizontal web 86 of the cartridge holder. The cartridge holders can be easily removed from arms 56 if desired by pushing out the pins 59.

In order to keep the wiper ring 67 firmly against the bottom of the glass when the wiper is operated, a spring 78 (FIG. 4) is mounted around the shaft 51 and engages the bottom 79 of the handle hub portion. The lower end of the spring engages the top of washer 81 which bears on an O-ring 82 received and thereby seated in a recess in the top of the head portion of the bushing 52 and serves to prevent vapors from the cargo tank from escaping around the shaft 51. Washers 83 sandwiched between the bushing head flange and the glass top, and washer 84 around the threaded lower end of the bushing and located between the nut 53 and the glass bottom, prevent leaks around the bushing. At the top of the glass, the washer is made of Viton, and the one on top of it and the one under the glass are made of Teflon material. The nut 53 is installed tightly enough to achieve the desired sealing, and is then locked in place by adhesive. The upward force of the spring against the handle hub is transmitted through the shaft 51, arm 56, pin 59, cartridge holder 58 and the tops of the set screws 65 against the top margins of the cartridge grooves to the glass engaging portion of the O-ring. It can be seen that the handle hub shown in FIG. 4 has the set screw 54 below the handle, while FIG. 1 shows them above the handle. It can be done either way.

The arcs covered by the two wipers overlap to some extent but this is not a problem since they are individually manually operated.

As an example, the deck cutout opening may be 5 ⅛ inches wide and 11 ⅛ inches long. The size of the assembly is such that there may be 59 square inches of viewing area through the glass. Also, 34 square inches of the viewing area is wiped, half of it by each of the blades.

The blades (the upper edge of the O-ring as mentioned above) can be readily changed since they are standard, off-the-shelf, O-ring s which may be made of an elastomeric material selected for its tolerance to the type of chemical to be contained in the hold. For example, if the cargo is to be a fuel for diesel engines or jet engines, the material may be a No. 328 Viton brand elastomer with Teflon brand impregnation. If the material to be contained in the hold is a solvent or other chemical such as acetone, an EPDM elastomer may be used.

The glass may be a ⅜ inch thick No. 7740 Pyrex brand ground and polished plate glass which is stress relieved with ground edges and radiused corners. Although the deck flange 14, 17 may be made of a carbon steel material to facilitate ship yard installation to the deck, most of the other metal components are made of No. 303 stainless steel. The glass cover 32 may be made of aluminum, if desired. The gaskets would be industrial quality materials of the Teflon, Viton or Buna N types. In most instances, the gaskets 22 and 26 are likely to be Teflon brand polytetrafluorethylene polymer. It should be understood that materials other than those here specified might also be used with good success.

The typical site for the present invention is the top of a liquid-containing cargo tank of a barge. It can also be used on an expansion dome or a hatch or virtually anyplace desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In that regard, where the term "glass" is used in the claims which follow, it should be understood to include materials other than silica-based glass and which are transparent to visually discernible light.

Also, for example, the wiper element might be a discrete strip of non-elastomeric material and, if mounted in a cartridge, might be guided by ribs in the cartridge holder or ribs in the cartridge and grooves in the holder.

What is claimed is:

1. In combination with a cargo compartment, a sight glass assembly comprising:
   a base frame sealingly adhered to the top of the compartment and forming a frame around an opening through the top of the compartment;
   the base frame having an upstanding frame portion and a perimetrical flange extending laterally outward from the frame portion around the perimeter of the frame portion;
   a first sealing ring mounted on top of the frame around the perimeter of the frame portion;
   a sight glass mounting frame mounted to the top of the first sealing ring and secured to the flange;
   a sight glass sealingly mounted to the mounting frame;
   a glass retainer frame secured to the mounting frame and sealingly confining the sight glass; and
   a wiper assembly including a wiper cartridge assembly immediately below the glass and including a wiping element engaging the lower face of the glass, a driving member above the glass operatively associated with the wiper cartridge assembly and operable from above the glass to operate the wiper cartridge assembly to move the wiping element along the lower face of the glass, and thereby wipe foreign material from the lower face of the glass;
   the cargo compartment being in a boat, and the top of the cargo compartment being boat deck;
   the base frame being welded to the deck around the entire perimeter of the frame; and
   the sight glass mounting frame being secured to the flange by a plurality of fasteners having heads under the flange and screw threaded shanks screwed into the mounting frame.

2. In combination with a cargo compartment, a sight glass assembly comprising:
   a base frame sealingly adhered to the top of the compartment and forming a frame around an opening through the top of the compartment;
   the base frame having an upstanding frame portion and a perimetrical flange extending laterally outward from the frame portion around the perimeter of the frame portion;
   a first sealing ring mounted on top of the flange around the perimeter of the frame portion;
   a first sealing ring mounted on top of the flange around the perimeter of the frame portion;
   a sight glass mounting frame mounted to the top of the first sealing ring and secured to the flange;
   a sight glass sealingly mounted to the mounting frame;
   a glass retainer frame secured to the mounting frame and sealingly confining the sight glass; and
   a wiper assembly including a wiper cartridge assembly immediately below the glass and including a wiping element engaging the lower face of the glass, a driving member above the glass operatively associated with the wiper cartridge assembly and operable from above the glass to operate the wiper cartridge assembly to move the wiping element along the lower face of the glass, and thereby wipe foreign material from the lower face of the glass;
   the cartridge assembly including a cartridge having a receiver therein holding the wiping element in a manner to facilitate the maintenance of the wiping element on the lower face of the glass;
   the wiper assembly including a wiper arm below the glass and coupled to the driving member;
   the cartridge assembly including a cartridge holder movably mounted to the wiper arm to enable the cartridge to maintain a generally elongate portion of the wiper element on the glass as the wiping element is moved along the lower face;
   the lower face of the glass being planar;
   the cartridge holder being pivotally mounted to the wiper arm to pivot about and axis parallel to the plane of the lower face of the glass;
   the wiper arm and driving member being connected to a shaft having a rotational axis perpendicular to the plane of the lower face of the glass;

the cartridge having a pair of grooves extending longitudinally and parallel to each other in planes perpendicular to the lower face of the glass and to the pivot axis of the cartridge holder; and the cartridge holder having guides thereon slidably receiving the cartridge grooves on the guides enabling installation of the cartridge on the holder by sliding the cartridge onto the holder in a direction toward the rotational axis of the wiper arm shaft.

3. The combination of claim 2 and wherein:

the cartridge has a pin received therethrough and located between the shaft and the cartridge holder and abuttingly engagable with an end of the cartridge holder upon movement of the cartridge in the cartridge holder in a direction away from the shaft to prevent inadvertent separation of the cartridge from the cartridge holder.

4. The combination of claim 2 and wherein:

the cartridge holder is H-shaped in cross section, having an upwardly opening channel and a downwardly opening channel and receiving the wiper arm in the downwardly opening channel and receiving the cartridge in the upwardly opening channel; and the guides include two pairs of longitudinally spaced guide stems secured in the holder and projecting into the upwardly opening channel from the sides of the channel, and the pair of longitudinally extending grooves in the cartridge are in the sides of the cartridges and open outward in the sides of the cartridge and receive the guide stems therein whereby the guide stems are supporting the cartridge in the holder.

* * * * *

UNITED STATES PATENT AND TRADEMARK OFFICE
CERTIFICATE OF CORRECTION

PATENT NO. : 5,284,105
DATED : February 8, 1994
INVENTOR(S) : Larry C. Wilkins

It is certified that error appears in the above-identified patent and that said Letters Patent is hereby corrected as shown below:

Column 5, line 65, change "frame" to --flange--.

Signed and Sealed this

Fifth Day of July, 1994

Attest:

BRUCE LEHMAN

Attesting Officer

Commissioner of Patents and Trademarks